United States Patent
Fang et al.

(10) Patent No.: US 9,961,925 B2
(45) Date of Patent: May 8, 2018

(54) METHOD FOR REDUCING THE PRECURSOR OF ETHYL CARBAMATE IN SOY SAUCE

(71) Applicants: Fang Fang, Wuxi (CN); Jian Chen, Wuxi (CN); Xifei Yang, Wuxi (CN); Jiran Zhang, Wuxi (CN); Guocheng Du, Wuxi (CN); Danyi Liao, Wuxi (CN)

(72) Inventors: Fang Fang, Wuxi (CN); Jian Chen, Wuxi (CN); Xifei Yang, Wuxi (CN); Jiran Zhang, Wuxi (CN); Guocheng Du, Wuxi (CN); Danyi Liao, Wuxi (CN)

(73) Assignee: Jiangnan University, Wuxi, JS (CN)

( * ) Notice: Subject to any disclaimer, the term of this patent is extended or adjusted under 35 U.S.C. 154(b) by 85 days.

(21) Appl. No.: 14/672,244

(22) Filed: Mar. 30, 2015

(65) Prior Publication Data
US 2015/0282512 A1 Oct. 8, 2015

(30) Foreign Application Priority Data
Apr. 2, 2014 (CN) .......................... 2014 1 0132103

(51) Int. Cl.
*A23L 1/211* (2006.01)
*A23L 5/20* (2016.01)
*A23L 11/30* (2016.01)

(52) U.S. Cl.
CPC .............. *A23L 1/2118* (2013.01); *A23L 5/28* (2016.08); *A23L 11/37* (2016.08); *A23V 2002/00* (2013.01)

(58) Field of Classification Search
CPC ............................ A23L 1/2118; A23L 1/0158
See application file for complete search history.

(56) References Cited

U.S. PATENT DOCUMENTS

2009/0162479 A1* 6/2009 Nakatoh ................ A23L 1/238
426/46
2012/0282243 A1* 11/2012 Endo ..................... A23L 1/3053
424/115

OTHER PUBLICATIONS

Matsudo et al. "Determination of Ethyl Carbamate in Soy Sauce and Its Possible Precursor" 1993 vol. 41 Journal of Agricultural and Food Chemistry pp. 352-356.*
(Continued)

*Primary Examiner* — Felicia C Turner
(74) *Attorney, Agent, or Firm* — Lili Chen

(57) ABSTRACT

The present invention provides a method for reducing EC precursor, citrulline, in soy sauce by inoculating *T. halophilus* BBE R23 during soy sauce fermentation. Compared to the control, citrulline and EC in soy sauce prepared with *T. halophilus* BBE R23 is decreased by 86% and 50%, respectively. Addition of $10^6$ CFU/mL *T. halophilus* BBE R23 also increases volatile flavoring compounds and free fatty acids concentration in the soy sauce product. The present invention provides a method of making soy sauce that not only reduces accumulation of EC precursor citrulline but also improves soy sauce flavor.

9 Claims, 2 Drawing Sheets

(56) References Cited

OTHER PUBLICATIONS

Lee et al. Comparative Volatile Profiles in Soy Sauce According to Inoculated Microorganisms Bioscience, Biotechnology, Biochemistry vol. 77 No. 11 2013.*
Liang et al. (Derwent Abstract CN 103815384 3 pages).*
Shurtleff and Aoyagi "History of Koji Grains and or soybeans enrobed with a mold culture" Soyinfo Center 2012 http://www.soyinfocenter.com/pdf/154/Koji.pdf pp. 1-5.*
Lu et al. 9 pages ProQuest Translation Jul. 4, 2012 Yellow wine yeast engineering strain with low urea yield and construction method thereof—Patents—ProQuest Dialog.*
Li et al. Derwent Abstract Oct. 19, 2011 CN10222390 2 pages.*

* cited by examiner

METHOD FOR REDUCING THE PRECURSOR OF ETHYL CARBAMATE IN SOY SAUCE

CROSS-REFERENCES AND RELATED APPLICATIONS

This application claims the benefit of priority to Chinese Application No. 201410132103.3, entitled "A method for reducing the precursor of ethyl carbamate in soy sauce", filed Apr. 2, 2014, which is herein incorporated by reference in its entirety.

BACKGROUND OF THE INVENTION

Field of the Invention

The present invention relates to the field of microbial production. In particular, it relates to a method of using a novel microorgarnism to reduce the precursor of ethyl carbamate in soy sauce.

Description of the Related Art

Ethyl carbamate (EC) widely exists in fermented products such as rice wine, wine, soy sauce and soybean paste. EC is classified as a class 2A carcinogen by the World Health Organization (WHO). It has been reported that EC could induce lung cancer, liver cancer, skin cancer and other cancers. It has aroused widespread concerns as to the food safety issue caused by EC in fermented products. However, there is no effective way to remove the EC in soy sauce. EC generated from precursors during soy sauce sterilization process is extremely hard to be degraded.

An effective way to remove EC in soy sauce is reducing the amount of EC precursors. Studies have shown that ethanol, citrulline and urea are the main precursors for producing EC in soy sauce. The amount of ethanol, citrulline and urea in soy sauce is 2.5%, 2.2 g/L and 57 mg/L, respectively. 80% of EC in soy sauce is made by reaction of ethanol and citrulline. Since ethanol is a primary flavoring compound in soy sauce, reducing citrulline accumulation in soy sauce is an effective way to decrease the amount of EC without affecting soy sauce flavor.

*Tetragenococcus halophilus* belongs to genus *Lactobacillus*, which is formerly classified as *halophilic Pediococcus*, and is now classified as a *Tetragenococcus*. It exists widely in salted products, such as Japanese soy sauce, salted anchovies and Indonesia soy sauce. Adding *Tetragenococcus halophilus* in the production of soy sauce can improve the flavor and quality of the soy sauce. It has no report that addition of *Tetragenococcus halophilus* can decrease the accumulation of EC in soy sauce. It is the goal of the present invention to provide a method of reducing the amount of EC precursors in soy sauce by use of a novel strain of *Tetragenococcus halophilus*.

DETAILED DESCRIPTION

The goal of the present invention is to provide a novel microorganism, *Tetragenococcus halophilus* (*T. halophilus*) BBE R23, which can use arginine, but does not accumulate citrulline.

In a preferred embodiment, the *T. halophilus* BBE R23 was conserved at China Center for Type Culture Collection (CCTCC), located at Wuhan University, Luojiashan, Wuhan, Hubei 430072, China, on Oct. 20, 2013 with an accession No. of CCTCC NO: M2013480.

In another embodiment, the present invention provides a method for reducing precursors of ethyl carbamate in soy sauce by artificially inoculating *T. halophilus* during soy sauce fermentation.

In a preferred embodiment, the precursor of ethyl carbamate is citrulline.

In a preferred embodiment, *T. halophilus* inoculated during soy sauce fermentation is *Tetragenococcus halophilus* BBE R23.

In a preferred embodiment, *T. halophilus* is artificially inoculated when koji and salted water are mixed.

In a preferred embodiment, the inoculation amount of *T. halophilus* is $10^6$~$10^7$ CFU/mL.

In a preferred embodiment, the inoculation amount of *T. halophilus* is $10^6$ CFU/mL.

In a preferred embodiment, the present invention provides a method of reducing the amount of EC precursors in soy sauce, comprising the steps for preparation of koji: 1), soaking defatted soybean and parched wheat in water for 8 hours, and sterilizing at 121° C. for 8 minutes; 2), mixing the soaked soybean, parched wheat, bran and flour according to a mass ratio of (15-25):(10-20):1:1, and inoculating the mixture with *Aspergillus oryzae* spore to obtain a preliminary koji; 3) fermenting until the color of the preliminary koji turned light green to obtain a mature koji.

In a preferred embodiment, the present invention provides a method of reducing the amount of EC precursors in soy sauce, further comprising the steps of: 1), mixing the mature koji and 20% salted water (e.g. 20% NaCl solution) with a mass ratio of 1: (1.0-2.0) and simultaneously inoculating $10^6$~$10^7$ CFU/mL *T. halophilus* BBE R23; 2), cultivating the mixture at 10-15° C. for 7 days; 3), inoculating *Zygosaccharomyces rouxii* on the seventh and the fourteenth day separately, and continuing fermentation at room temperature until 80th-120th day.

In a preferred embodiment, the present invention provides a method of reducing the amount of EC precursors in soy sauce, comprising the steps of: 1), soaking defatted soybean and parched wheat in water for 8 hours, and sterilizing at 121° C. for 8 minutes; 2), mixing the soaked soybean, parched wheat, bran and flour according to a mass ratio of (15-25):(10-20):1:1, and inoculating the mixture with *Aspergillus oryzae* spore (inoculation rate: 300 gram microbe per ton of mature koji) to obtain a preliminary koji; 3) fermenting at 30° C. for 46-48 hours until the color of the preliminary koji turned light green to obtain a mature koji; 4), mixing the mature koji and 20% salted water with a mass ratio of 1:1.7 and simultaneously inoculating $10^6$~$10^7$ CFU/mL *T. halophilus* BBE R23; 5), cultivating the mixture at 10-15° C. for 7 days; 6), inoculating *Zygosaccharomyces rouxii* ($10^7$ CFU/mL) on the seventh and the fourteenth day separately, and continuing fermentation at room temperature until 90th day.

The present invention provides a method for reducing EC precursor citrulline in soy sauce by inoculating *T. halophilus* BBE R23 during soy sauce fermentation. Comparing to the control, citrulline and EC in soy sauce is decreased by 86% and 50%, respectively. In addition, addition of $10^6$ CFU/mL *T. halophilus* BBE R23 also increases the amount of volatile flavoring compounds and free fatty acids in the final product. It is noteworthy that β-ethyl benzene ethanol, glycerol, (S)-1-phenyl-1,2-glycol, methyl acprylate, elaidic acid ethyl ester, methyl linoleate, 2,3-acetyl caproyl and 3-hydroxyl-2,6-dimethylpyran-4-ketone are new aroma compounds detected only in soy sauce inoculated with *T. halophilus* BBE R23. In summary, the soy sauce made by the present invention has not only reduced EC and its precursor citrulline, but also improved flavor of the final soy sauce product.

EXAMPLES

Figure 1:
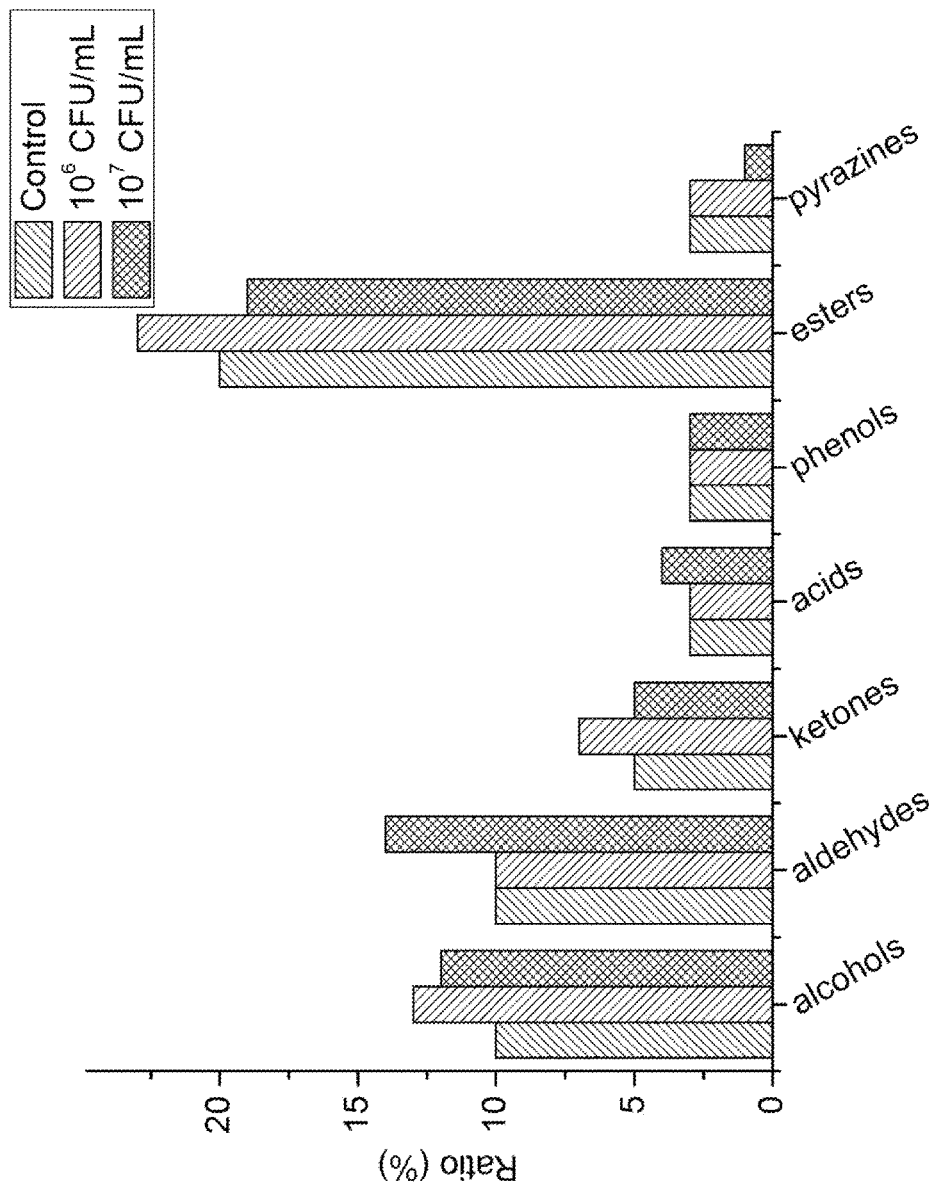
FIG. 1. Comparison of distribution of flavoring compounds in soy sauce made by different methods.

The following examples are provided for illustration purposes, are not intended to limit the scope of the invention, which is limited only by the claims.

Materials and Methods

1. Determination of EC by GC/MS (1) Sample pretreatment: 10 g liquid soy sauce sample, 1 mL N-amino propyl formate (internal standard) and distilled water were mixed to get 40 g mixture. The liquid mixture was injected into solid phase extraction column with Extrelut QE celite as the stationary phase and eluted with 80 mL dichloromethane. The eluent was concentrated to 2-3 mL by a rotatory evaporator at 30° C. and further concentrated to 1 mL by a nitrogen concentrator.

(2) Conditions for GC/MS analysis: The column, J&W DB-WAX Quartz Capillary (30 m×0.25 mm, ID 0.25 μm), was held at 40° C. for 0.75 min and then heated to 60° C. at 10° C./min, to 150° C. at 3° C./min, and to 220° C. as quickly as possible. The final temperature was held constant for 4.25 min. Helium was used as the carrier gas at a flow rate of 1 mL/min. 1 μL well-prepared sample together with internal standard was injected into the column. The injection mode was splitless. General profiles of the pyrolysates were carried out using electron impact (EI) mode: electron energy, temperature of the transmission line and ion source temperature were held at 70 eV, 180° C. and 200° C., respectively. Specific m/z characteristics were selected, for instance, m/z 62, m/z 74 and m/z 89 for qualitative analysis, and m/z 62 for quantitative measurement.

(3) Data analysis: m/z=62 was chosen to represent EC and the concentration of EC was calculated based on an internal standard method.

2. The concentration of flavoring compounds in soy sauce was determined by gas chromatography.

5 ml of soy sauce was preheated at 45° C. for 15 minutes and extracted in a solid phase micro-extractor for 40 minutes. The soy sauce extract was loaded in a gas chromatography for analysis of the flavoring compounds.

3. The concentration of citrulline in soy sauce was measured using HPLC.

(1) Sample preparation: 1 mL soy sauce was placed in a 25 ml volumetric flask and trichloroacetic acid (TCA) was added to a total volume of 25 mL. The TCA solution was degassed for 10 minutes by ultrasound, settled for 5 minutes and degassed for another 10 minutes. The degassed solution was filtered through a 0.22 μm filter membrane and is ready for HPLC analysis.

(2) Conditions for HPLC analysis: O-xylene (OPA) and 9-fluorenylmethyl chloroformate (FMOC) were used as pre-column derivation. Citrulline in the sample was determined by HPLC (Agilent liquid chromatography 1200 series, Santa Clara, Calif.) with a Hypersil ODS-2 column (250 mm×4.6 mm×5 μm). The mobile phase flow rate was 1.0 mL·min$^{-1}$.

The column temperature was maintained at 40° C. Citrulline was detected by a UV detector (excitation wavelength at 338 nm, absorption at 262 nm).

Mobile phase A: 8.0 g/L Sodium acetate trihydrate, 225 μL/L Triethylamine, 50 mL/L acetic acid, 5 mL/L Tetrahydrofuran, pH 7.20±0.05.

Mobile phase B: 12.0 g Sodium acetate trihydrate was dissolved in 400 mL ultrapure water and adjust pH to 7.20±0.05 with acetum (5%) before mixing with 800 mL acetonitrile and 800 mL methanol.

TABLE 1

| Gradient elution procedure | | | |
|---|---|---|---|
| Time (min) | A% | B% | Flow rate (mL/min) |
| 0 | 92 | 8 | 1.0 |
| 27.5 | 40 | 60 | 1.0 |
| 31.5 | 0 | 100 | 1.5 |
| 32 | 0 | 100 | 1.5 |
| 34 | 0 | 100 | 1.0 |
| 35.5 | 92 | 8 | 1.0 |

4. Cultivation conditions for *T. halophilus* BBE R23.

*T. halophilus* BBE R23 was cultivated on a MRS agar plate containing 100 g/L NaCl at 30° C. for 4 days and then transferred to MRS liquid medium containing 10% NaCl at 30° C. for 4 days. MRS medium (g/L): Peptone 8, Beef extract 4, Yeast extract 4, Glucose 20, Sodium acetate 5, Ammonium citrate 2, $MgSO_4 \cdot 7H_2O$ 0.2, $K_2HPO_4$ 2, $MgSO_4 \cdot 4H_2O$ 0.05, sorbic acid 1 ml, pH7.0.

Example 1. Determination of the Precursors of EC in Soy Sauce

Sterilization process, the final step before people get the end products, is the step that generates most of the EC in soy sauce because. It was measured earlier that Japanese soy sauce contains 57.7 mg/L urea, 2.2 g/L citrulline before sterilization and 40 μg/L EC after sterilization. In order to study the reaction kinetics between EC and its precursors, different concentrations of the precursors were mixed as shown Reaction 1-3 below and sterilized at 95° C. for 30 min.

Reaction 1: urea 0 mg/L, citrulline 2 g/L, ethanol 2% (v/v).

Reaction 2: urea 50 mg/L, citrulline 0 g/L, ethanol 2% (v/v).

Reaction 3: urea 50 mg/L, citrulline 2 g/L, ethanol 0% (v/v).

TABLE 2

| Concentrations of EC (After sterilization) and its precursors (Before sterilization) | | | | |
|---|---|---|---|---|
| Compounds | Urea (mg/L) | Citrulline (g/L) | Ethanol (%) | EC (μg/L) |
| Raw soy sauce | 57.7 | 2.2 | 2-2.5 | 40 |
| Reaction 1 | 50 | 0 | 2 | 10.2 |
| Reaction 2 | 0 | 2 | 2 | 32.3 |
| Reaction 3 | 50 | 2 | 0 | ND |

Note:
ND, not detected.

As it can been seen from Table 2, only 10.2 μg/L EC was synthesized without citrulline. No EC was synthesized without ethanol. It is confirmed that citrulline and ethanol are major precursors for EC production.

Example 2. Procedure of Making Soy Sauce with Addition of *T. halophilus* BBE R23

Preparation of koji: defatted soybean and parched wheat were soaked in water for 8 hours and sterilized at 121° C. for 8 minutes. The cooled soybean, parched wheat, bran and flour were mixed according to a mass ratio of 20:15:1:1, and the mixture was inoculated with *Aspergillus oryzae* spore (inoculation rate: 300 gram microbe per ton of mature koji) to obtain a preliminary koji. The preliminary koji was incubated at 30° C. for 46-48 hours, with occasional mixing every 6-8 hours, until the color of the preliminary koji turned light green to obtain a mature koji.

Fermentation process: the mature koji and 20% salted water were mixed with a mass ratio of 1:1.7. $10^5$, $10^6$ or $10^7$ CFU/mL *T. halophilus* BBE R23 was simultaneously inoculated into the koji mixture and cultivated at 10-15° C. for 7 days. The koji fermentation without inoculation of *T. halophilus* BBE R23 was used as the control. *Zygosaccharomyces rouxii* ($10^7$ CFU/mL) was inoculated into the koji fermentation broth on the seventh and the fourteenth day separately, and the fermentation continued at room temperature until the 90th day.

Example 3. Effects of Inoculation of *T. halophilus* BBE R23 on EC and Amino Acid Concentrations of Soy Sauce 1. Preparation of Concentrated *T. halophilic*

1% *T. halophilic* was inoculated into the MRS culture medium (pH=7.0) with 10% NaCl and cultured at 30° C. for 3 days until the cell concentration reached the maximum ($OD_{600}$ is 3.95). The cells were collected by centrifugation at 10,000 rpm for 5 minutes, and resuspended in 1% saline to obtain a concentrated suspension of *T. halophilic*.

2. Culture of Mature Koji and *T. halophilic* BBE R23

In the process of soy sauce brewing, the mature koji mixed with 20% saline was inoculated with different concentrations of *T. halophilic* BBE R23. The final inoculation concentration of *T. halophilic* BBE R23 is $10^5$, $10^6$ or $10^7$ CFU/mL. The koji fermentation without inoculation of *T. halophilus* BBE R23 was used as the control. Each sample was repeated for three times.

3. Measurement of EC and Free Amino Acid Concentration in Soy Sauce

The concentrations of citrulline, EC and free amino acids in soy sauce products that were inoculated with different concentrations of *T. halophilus* BBE R23 during the brewing process were measured by HPLC and/or GC/MS.

As shown in Table 3, the soy sauce in the control group contained 3.19 g/L citrulline, and inoculation of $10^6$ and $10^7$ CFU/mL *T. halophilus* BBE R23 decreased citrulline content in soy sauce to 0.46 g/L (14.4% of the control). It was clear that addition of *T. halophilus* BBE R23 during the soy sauce brewing process helped decrease the amount of citrulline in the soy sauce before sterilization.

After sterilization, EC concentration will increase due to high temperature treatment, for example, the EC content in the control group increased 54.68%. The EC concentration in the final soy sauce product was lowered to 31.3% and 49.5% of the control level when the brewing process was inoculated with $10^7$ and $10^6$ CFU/mL *T. halophilus* BBE R23, respectively. It is shown that the amount of the EC precursor, ethanol, does not change significantly among different groups, and that only the amount of citrulline is significantly decreased in the group treated with *T. halophilus* BBE R23. These results indicated that addition of *T. halophilus* BBE R23 to the soy sauce brewing process is an effective way to reduce accumulation of EC precursor, citrulline, and thus EC content in the final product.

Free amino acid contents in different groups of soy sauce products were shown in Table 4. The free amino acid contents in soy sauce products inoculated with $10^7$, $10^6$, $10^5$ and zero CFU/mL *T. halophilus* BBE R23 are 40.85, 58.81, 53.29 and 43.16 g/L, respectively. Addition of $10^7$ CFU/mL *T. halophilus* BBE R23 can greatly reduce citrulline concentration. But it had a negative effect on amino acid content in the soy sauce. The optimum inoculation rate is $10^6$ CFU/mL *T. halophilus* BBE R23, which resulted in reduced citrulline accumulation and increased amount of amino acids in the final soy sauce product.

TABLE 3

Concentration of EC and its precursors in soy sauce

| Sample | Ethanol % w:v | Urea mg/L | Citrulline g/L | EC μg/L (Before sterilization) | EC μg/L (After sterilization) |
| --- | --- | --- | --- | --- | --- |
| 1 | 0.74 | 20.9 | 3.19 | 50.72 ± 0.44 | 111.91 ± 12.90 |
| 2 | 0.58 | 26.6 | 0.46 | 36.22 ± 1.51 | 55.12 ± 2.75 |
| 3 | 0.64 | 15.6 | 0.46 | 27.77 ± 0.52 | 35.31 ± 1.85 |

Note:
sample 1, control; sample 2, soy sauce prepared with $10^6$ CFU/mL *T. halophilus* BBE R23; sample 3, soy sauce prepared with *T. halophilus* BBE R23 $10^7$ CFU/mL.

TABLE 4

Influence of different inoculation amount on free amino acids content in soy sauce

| | Inoculation amount (CFU/mL) | | | |
| --- | --- | --- | --- | --- |
| | $10^7$ | $10^6$ | $10^5$ | 0 |
| Free amino acids (g/L) | 40.85 | 58.81 | 53.29 | 43.16 |

Note:
the free amino acids in the table includes Asp, Glu, Ser, His, Gly, Thr, Cit, Arg, Ala, Tyr, Cys, Val, Met, Phe, Ile, Orn, Leu, Lys and Pro.

Example 4. Effects of Inoculation of *T. halophilus* BBE R23 on Flavor Substances of Soy Sauce Main flavorings of Japanese soy sauce are alcohols, aldehydes and esters. As shown in FIG. 1, there were 10 alcohols, 10 aldehydes, 10 ketones, 3 acids, 3 phenols, 20 esters and 3 pyrazines detected in control group soy sauce. Eight new flavoring compounds, including β-ethyl benzene ethanol, glycerol, (S)-1-phenyl-1,2-glycol, methyl acprylate, elaidic acid ethyl ester, methyl linoleate, 2,3-acetyl caproyl and 3-hydroxyl-2,6-dimethylpyran-4-ketone, were detected in soy sauce prepared with $10^6$ CFU/mL *T. halophilus* BBE R23.

Figure 2:
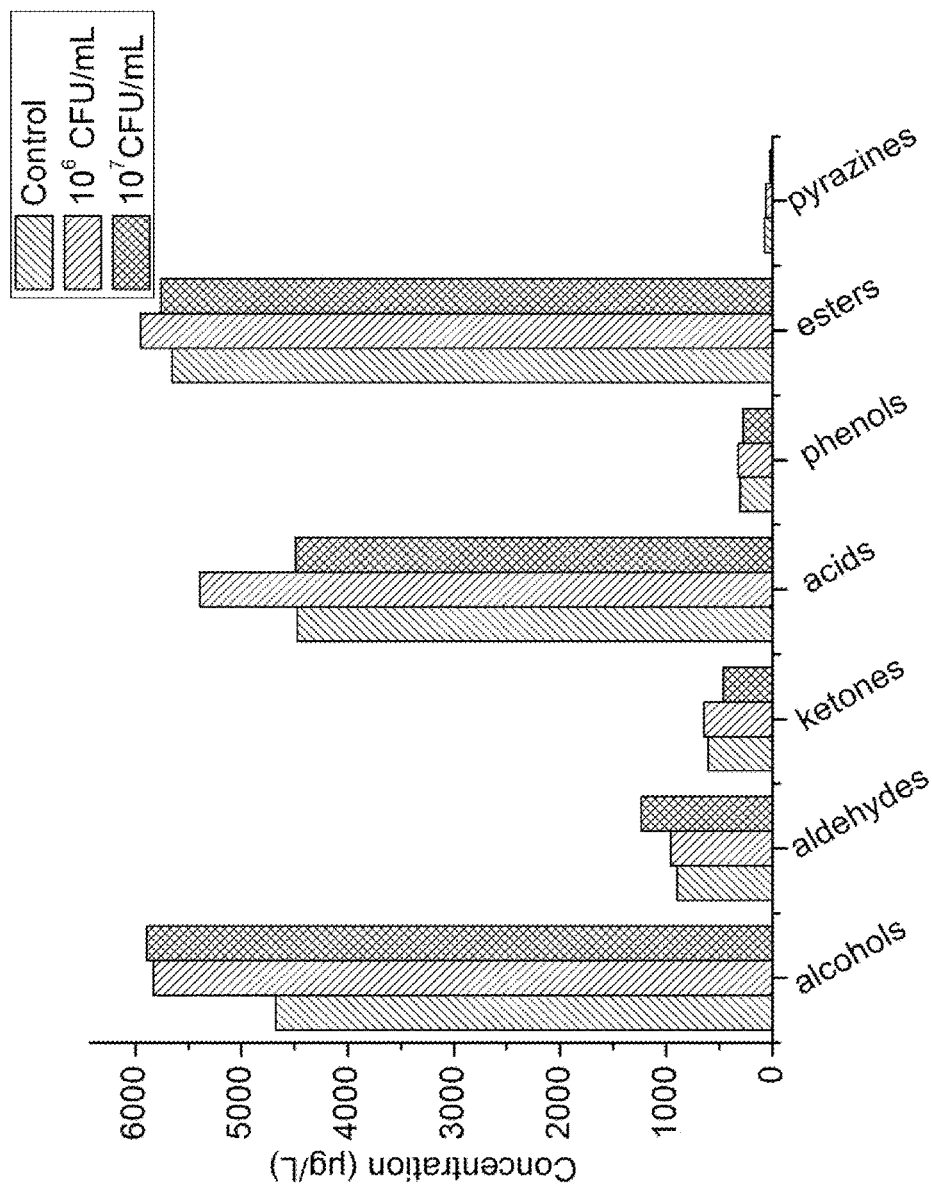
FIG. 2. Comparison of concentration of flavoring compounds in soy sauce made by different methods.

As regards to the content of flavoring compounds in soy sauce products, soy sauce prepared with $10^6$ CFU/mL *T. halophilus* BBE R23 has concentrations of alcohols (except ethanol), aldehydes, ketones, acids, phenols and esters increased by 24.73%, 6.64%, 7.02%, 20.61%, 6.53% and 5.25%, respectively. Pyrazines concentration is decreased by 13.67% compared to that of the control group, which had very little effect on soy sauce flavor. As shown from FIGS. 1 and 2, the quality of soy sauce prepared with $10^7$ CFU/mL *T. halophilus* BBE R23 is inferior to the ones prepared with $10^6$ CFU/mL *T. halophilus* BBE R23 in terms of the number of species and total amount of flavoring compounds in the final products.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method for reducing ethyl carbamate in a soy sauce product, comprising inoculating *Tetragenococcus halophilus* BBE R23 (*T. halophilus* BBE R23) when a soy sauce koji is mixed with saline during soy sauce production, wherein the *T. halophilus* BBE R23 is a novel strain that consumes arginine but does not accumulate citrulline, which was conserved in China Center for Type Culture Collection on Oct. 20, 2013 with an accession No. of CCTCC NO: M 2013480, and wherein ethyl carbamate in the soy sauce product inoculated with *T. halophilus* BBE R23 is less than that of the one without *T. halophilus* BBE R23 inoculation.

2. The method of claim 1, wherein ethyl carbamate in the soy sauce product inoculated with said *T. halophilus* BBE R23 is at least 50% less than that of the one without *T. halophilus* BBE R23 inoculation.

3. The method of claim 1, the inoculation amount of *T. halophilus* BBE R23 is $10^6 \sim 10^7$ CFU/mL.

4. The method of claim 2, the inoculation amount of *T. halophilus* BBE R23 is $10^6 \sim 10^7$ CFU/mL.

5. The method of claim 1, the inoculation amount of *T. halophilus* BBE R23 is $10^6$ CFU/mL.

6. The method of claim 2, the inoculation amount of *T. halophilus* BBE R23 is $10^6$ CFU/mL.

7. The method of claim 1, further comprising the steps for preparation of koji:
   1) soaking defatted soybean and parched wheat in water for 8 hours, and sterilizing at 121° C. for 8 minutes;
   2) mixing the soaked soybean and the parched wheat with bran and flour according to a mass ratio of (15-25):(10-20):1:1, and inoculating the mixture with *Aspergillus oryzae* spore to obtain a preliminary koji;
   3) fermenting until the color of the preliminary koji turned light green to obtain a mature koji.

8. A method of claim 1, further comprising the steps of:
   1) mixing a mature koji and 20% salted water with a mass ratio of 1:(1.0-2.0) and simultaneously inoculating $10^6 \sim 10^7$ CFU/mL *T. halophilus* BBE R23;
   2) cultivating the mixture at 10-15° C. for 7 days;
   3) inoculating *Zygosaccharomyces rouxii* on the 7th and the 14th day separately; and
   4) continuing fermentation at room temperature until 80th-120th day.

9. A method of claim 7, further comprising the steps of:
   1) mixing the mature koji and 20% salted water with a mass ratio of 1:(1.0-2.0) and simultaneously inoculating $10^6 \sim 10^7$ CFU/mL *T. halophilus* BBE R23;
   2) cultivating the mixture at 10-15° C. for 7 days;
   3) inoculating *Zygosaccharomyces rouxii* on the 7th and the 14th day separately; and
   4) continuing fermentation at room temperature until 80th-120th day.

* * * * *